Sept. 18, 1951 E. HENSCHKER ET AL 2,568,333
ROTARY FLYING SHEARS
Filed June 29, 1949 3 Sheets-Sheet 3
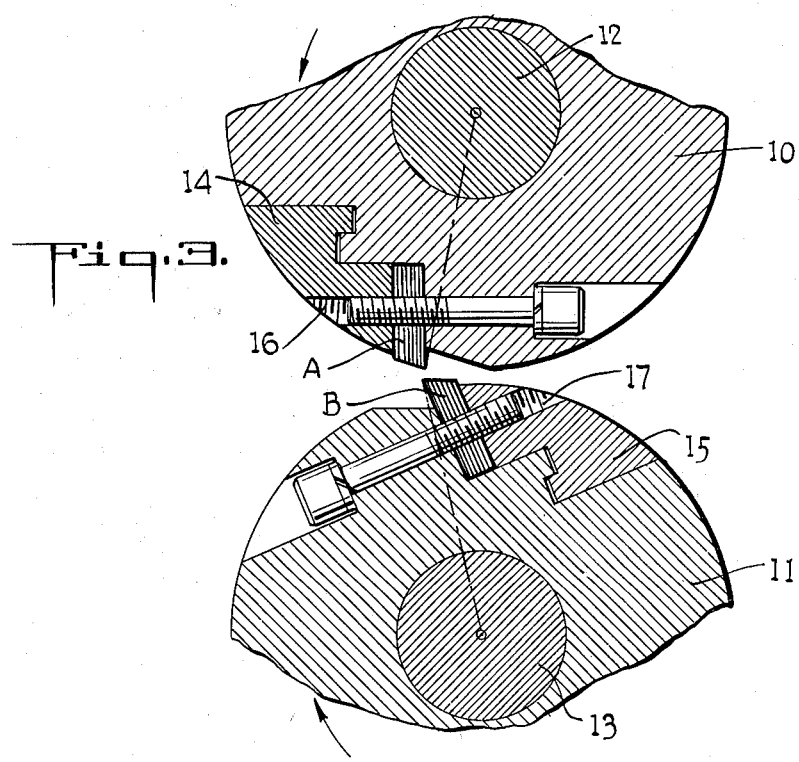
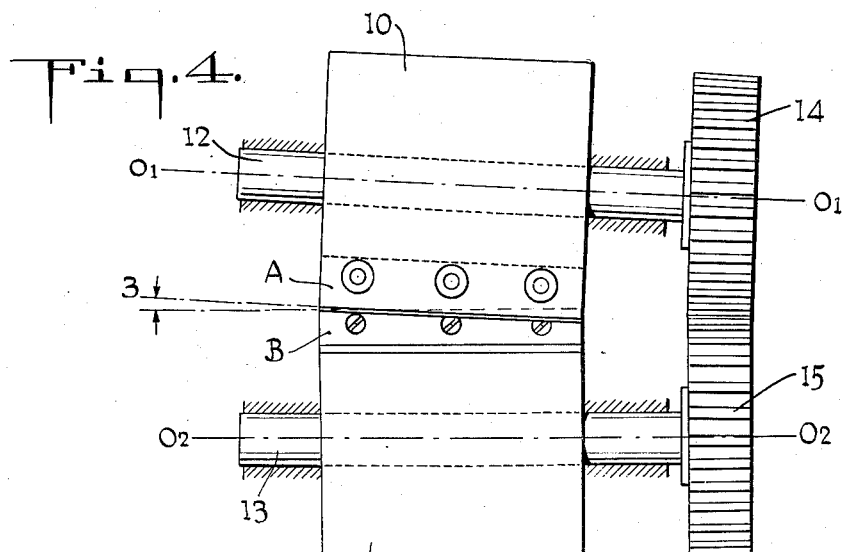
INVENTORS
ERHARD HENSCHKER
FRIEDRICH HACHENBURG
BY
Hammond & Littell
ATTORNEYS Patented Sept. 18, 1951

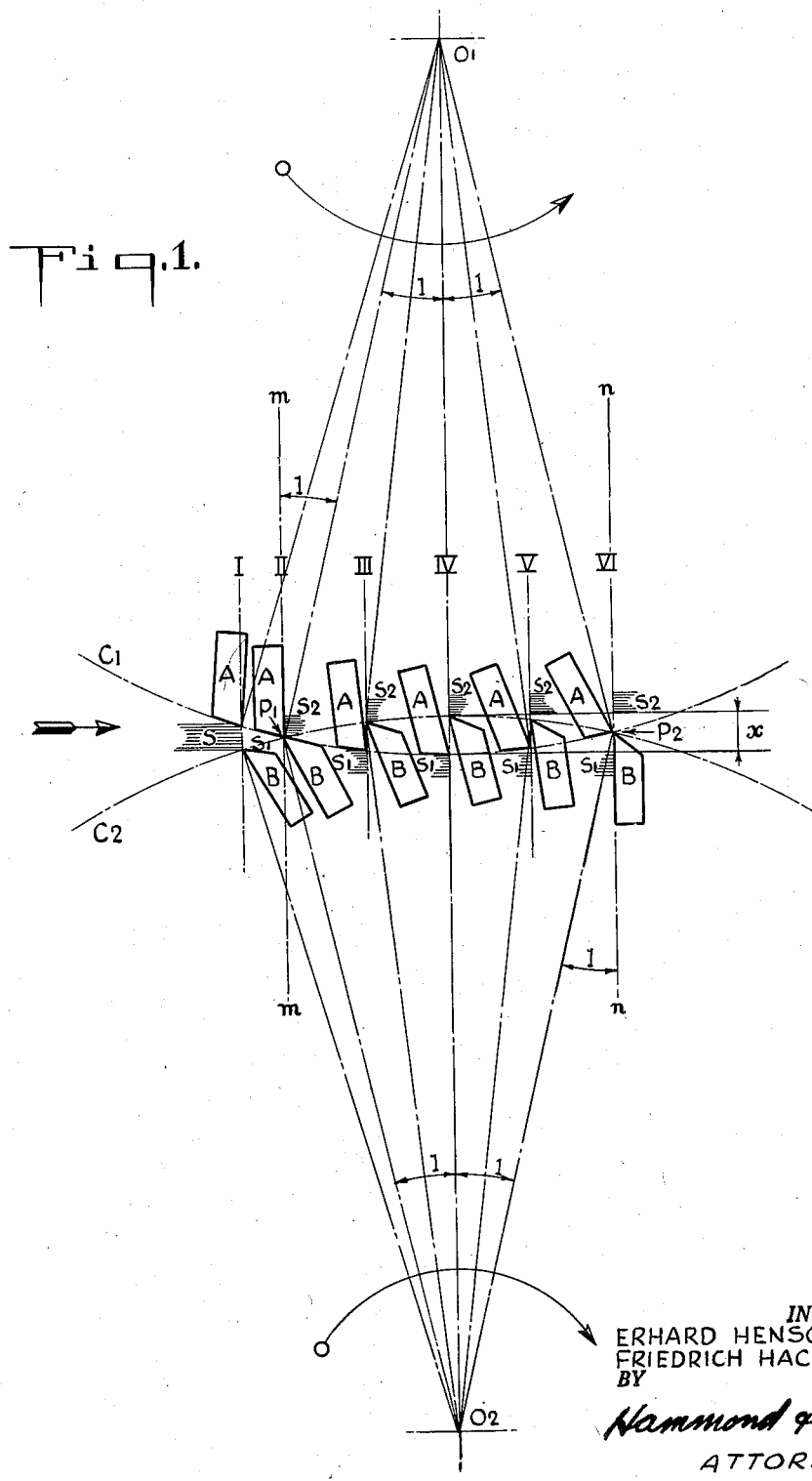

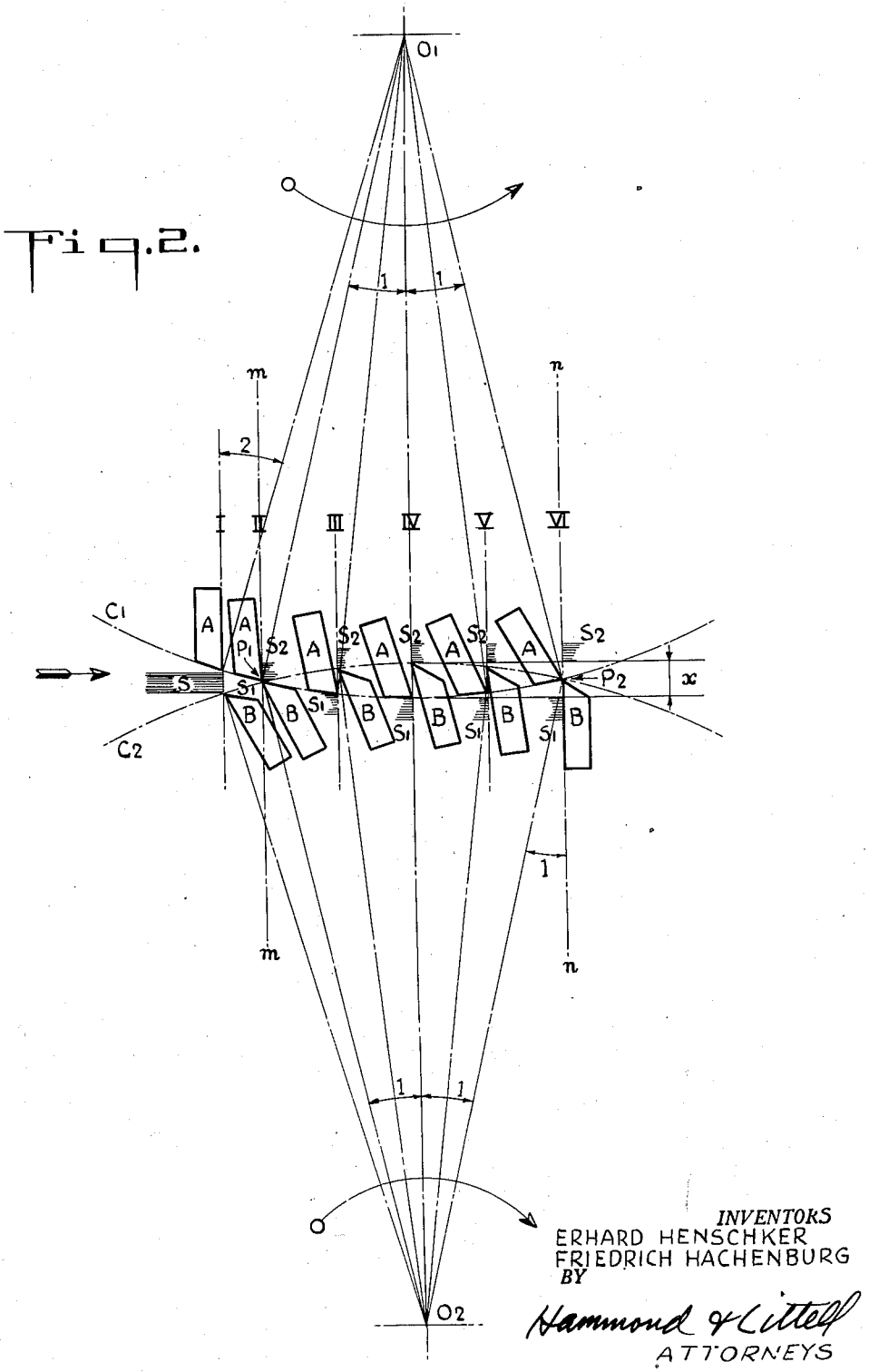

2,568,333

UNITED STATES PATENT OFFICE 2,568,333

ROTARY FLYING SHEARS

Erhard Henschker, Parkstone, and Friedrich Hachenburg, London, England, assignors to The Loewy Engineering Company Limited, London, England, a corporation of Great Britain Application June 29, 1949, Serial No. 101,944
In Great Britain December 22, 1947

3 Claims. (Cl. 164—66)

This invention relates to rotary flying shears for cutting moving metal strip or striplike material, in which the cutting blades or knives are mounted on carriers rotatable in opposite directions. In shears of this type, the blades or knives have to be so arranged on their respective carriers that the planes through the cutting edges—hereafter briefly called "the planes of cut"—will always be perpendicular to the strip, whatever the angular position of the carriers, as this is essential for obtaining a square cut.

True shearing, in contrast to mere nipping or pincing, is characterised by the feature that at least one of a pair of blades or knives co-operating in a cutting operation penetrate right through and beyond the material to be cut, and that the blades pass and overlap each other while cutting takes place. The theoretical condition for this overlapping consists, in the case of rotary shears of the type to which the invention refers, of the co-operating blades or knives being so disposed relative to each other, that the circles described by their cutting edges intersect at two points, hereafter called "the first" and "the second" point of intersection, in accordance with the order in which the blades pass through these points during their rotation. Each of a pair of co-operating blades will then, for part of its travel, move inside the cutting circle of the other blade, and the length of the stroke of the blades during which overlapping takes place is equal to the maximum distance of the two cutting circles between their points of intersection.

The obvious and normal arrangement for blades of rotary flying shears is to be mounted so that their flanks are radial with respect to the axes of rotation, but this arrangement is not practicable when the blades are at the same time so disposed that they overlap, inasmuch as radially mounted blades—provided that their flanks are flat—are bound to get into each other's way and to collide with each other as soon as they have passed the first point of intersection. Blades which were radially mounted on their carriers had, therefore, to be disposed in such a way that their cutting circles did not intersect, with the result that the blades did not overlap but only effected a mere pincing or nipping action.

It has been proposed to overcome this difficulty by giving the flanks of the blades or knives the shape of an involute or cycloid, so that they engage with each other like the teeth of two intermeshing gears. However, blades with curved flanks are difficult and expensive to manufacture and cannot easily be refashioned when worn. Furthermore, curved blades do not result in a square cut and are therefore unsuitable for many purposes.

It has also been proposed to pivot the blades or knives or their holders to the carriers, instead of mounting them rigidly thereon, and to control their positions by a system of links, so that the blades or knives are always maintained in positions in which they are perpendicular to the strip. This arrangement, while resulting in a square cut with overlapping, has all the serious disadvantages and complications inherent in non-rigid attachments. Blades which are pivoted to their carriers are also likely to project into the path of the strip after the cutting operation has been effected and will thus obstruct the free passage of the strip through the shear.

It is for this reason that rotary shears are not in general use for cutting moving metal strip, except for strip of light gauge, the sears employed being instead of the oscillating type. These shears are provided with a system of links which controls the movements of the blades so that they overlap without colliding. A serious disadvantage of these shears is that their moving parts, which are frequently of substantial size and weight, have to be accelerated to full speed, slowed down to a standstill and reversed for every single stroke, which is mechanically unsound. Furthermore, these shears do not give a truly square cut. Finally, the cut-off pieces are liable to be caught by the blades on their return stroke, especially if the material to be cut is deformed or warped as is the case with the trimmed-off seams of strips which are sheared into pieces by scrap-cutters.

It is one of the objects of the present invention to provide a rotary flying shear of the type set forth which gives an overlapping square cut without danger of collision between the co-operating blades or knives of one pair.

It is another object of the invention to provide a flying shear in which the blades or knives give a square overlapping cut and are at the same time rigidly mounted on their rotary carriers.

It is a still further object of the invention to provide a rotary flying shear of the type set forth which can be used for cutting heavy gauge material.

A still further object of the invention is to provide a rotary flying shear of the type set forth which requires reduced power for its operation.

These and other objects of the invention are achieved by mounting the blades or knives of a rotary flying shear in an inclined position relative to the radial plane through their cutting edges, the angle of inclination being such as to ensure that the co-operating blades or knives of a pair will always be on opposite sides of the planes of cut, which is a condition for preventing these blades or knives from getting into each other's way.

It has been found that the above result will be obtained if the angle of inclination is at least equal to half the angle included by the radial planes through the axes of rotation of the carriers at the points of intersection. The trailing blade, with this angle of inclination, will assume a position perpendicular to the material to be cut, or, which amounts to the same, parallel to the planes of cut at the latest when passing through the first point of intersection, and the leading blade will assume a corresponding position at the earliest when passing through the second point of intersection, the leading blade being the blade in advance of the trailing blade seen in the direction of rotation of both blades.

With the above-described arrangement, the blades or knives of a co-operating pair will never get into each other's way or collide at any one point of their rotation and it is therefore possible to use blades or knives with straight flanks and attach the blades or knives to the carriers by rigid means.

The angles of inclination of the blades of a co-operating pair do not have to be identical.

In metal-cutting shears, it is generally desirable that at least one of the two blades is slightly inclined in the plane of cut, so that this blade makes a gradual penetration through the material, whereby the force required for the cut is considerably reduced. It is therefore a further feature of the invention to arrange at least one of the carriers of a rotary flying shear so that its axis of rotation forms a small angle with the plane of the material to be cut. The blade mounted on that carrier will then be correspondingly inclined and will penetrate only gradually into the material.

The invention will now be described more in detail with reference to the accompanying drawings, in which:

Fig. 1 is a diagrammtic illustration of the various positions assumed by the blades of a shear according to the invention during the cutting operation.

Fig. 2 is a view similar to that of Fig. 1, in which the co-operating blades of a pair have different angles of inclination.

Figure 3 is a section through a part of the carriers of a rotary shear according to the invention, illustrating the way in which the blades are mounted on the carriers.

Fig. 4 is a diagrammatic front view of a rotary flying shear according to the invention, in which one of the carriers is inclined to the plane of the material to be cut.

Referring to Figs. 1 and 2, A and B are the trailing and the leading blades respectively of a rotary shear, the blades being mounted on carriers, not shown here, and adapted to rotate about the parallel axes $o_1$ and $o_2$ in opposite directions as indicated by the arrows. In doing so, the cutting edges of the blades A and B describe circles $c_1$ and $c_2$—the cutting circles—which intersect each other at the two points $P_1$ and $P_2$.

The strip of material S to be cut is fed through the shear in the direction of the arrow and is severed by the blades A and B into two sections $S_1$ and $S_2$, the speed of the strip and that of the blades A and B being synchronised with each other as known in the art, in order to avoid any buckling or tearing of the strip.

In the figures, the thickness of the strip S is somewhat exaggerated as compared with the blades A and B, to simplify the following description of the positions which the blades take up relative to the strip during one operation. Furthermore, the cutting edges of the two blades A and B are represented as always lying exactly in one vertical plane, while in practice there will be a slight clearance between both blades to ensure that they can pass each other freely when overlapping.

According to the present invention, the trailing blade A is angularly displaced with regard to the radial plane through its cutting edge in a direction opposite to its rotation. In the case of Fig. 1, the angle of inclination—designated by "1"—is exactly half of the angle between the two radial planes through the axes of rotation $o_1$, $o_2$ at the points of intersection $P_1$ and $P_2$. The blade A will thus be perpendicular to the strip S or parallel to the plane of cut $m$—$m$ when it passes through the point $P_1$.

The angle of inclination of the leading blade B is the same as that of the trailing blade A, and the leading blade will therefore be perpendicular to the strip S or parallel to the plane of cut $n$—$n$ when it passes through the point $P_2$.

In the case of Fig. 2, the angle of inclination of the trailing blade A—designated by "2"—is somewhat larger than the angle "1" and the blade A will be here in a position perpendicular to the strip S before it passes through the point $P_1$, the angle "2" being so selected that the blade B is perpendicular to the strip S at the moment of first contact between blade and strip. The angle of inclination of the leading blade B is the same in Fig. 2 as it is in Fig. 1.

Comparison of the Figs. 1 and 2 shows that all other conditions being equal, the larger the angle of inclination, the smaller the angle at the cutting edge of the blades, and as this latter angle cannot be reduced beyond a certain minimum value to obtain satisfactory cuts, the maximum angle of inclination is also limited.

In both figures, the blades A and B are illustrated in various positions (I to VI) which they assume consecutively during a cutting operation. These positions represent:

I. The first contact of the blades with the strip.

II. The passing of the blades through the first point of intersection $P_1$.

III. An intermediate position between the first point of intersection $P_1$ and the point of maximum overlap.

IV. The position of maximum overlap.

V. A position between the point of maximum overlap and the second point of intersection $P_2$.

VI. The passing of both blades through the second point of intersection $P_2$.

As can be clearly seen from Figs. 1 and 2, blades A and B will at any one point of their rotary movement about the axes $o_1$ and $o_2$ respectively, always be at opposite sides of the planes of cut, of which two are shown at $m$—$m$ and $n$—$n$. This is the condition for achieving an overlapping cut without any risk of the two blades A and B colliding with each other at any one point.

Provided that the angles of inclination of the blades A and B are selected in conformity with the invention, the cooperating blades of one pair will always be on opposite sides of the planes of cut, whatever the radius of the cutting circles $c_1$ and $c_2$, the position of the points of intersection $P_1$ and $P_2$ on those circles, and the thickness of the blades A and B. It will, therefore, be possible to realise the conditions for an overlapping square cut for strips of any thickness.

The cutting angle of the trailing blade A, apart from being determined by the angle of inclination as pointed out previously, is also determined by the consideration that the narrow face of this blade must not project outside the cutting circle $c_1$, for reasons which are obvious from Figs. 1 and 2. The narrow face of the leading blade B has to be set back somewhat from the circle $c_2$ to avoid the blade being pushed into the strip S from below during and after the cutting operation. A preferred arrangement is the one in which the narrow face of the blade B is parallel to the plane of the strip S at the point of first contact, which is the arrangement shown in Figs. 1 and 2.

The blades A and B are secured to their respective carriers 10 and 11 which are mounted on rotary shafts 12 and 13 by means of clamping pieces 14 and 15 and bolts 16 and 17 (Fig. 3). It is, however, to be noted that the manner in which the blades are fastened to their carriers is not essential for the invention. The shafts 12 and 13 can be driven by any suitable means, either directly or through the intermediary of reduction gears.

Fig. 4 shows a shear according to the invention in which the carrier 10 is inclined at a small angle "3" to the plane of the strip S, the shaft 12 of this carrier being driven from the shaft 13 of the other carrier through the intermediary of bevel gears 14 and 15. The blade A of the carrier 10 will be inclined at the same angle "3" as the carrier itself and will therefore penetrate into the strip only gradually, with the result that the impact of the first contact of this blade with the strip is greatly reduced.

The cutting edges of the blades A and B on both carriers are parallel to the axes of rotation $o_1$—$o_1$ and $o_2$—$o_2$ respectively, and therefore equidistant from those axes, so that the linear speeds of the blades will be the same at all points of their cutting edges, which is necessary for effecting a cut without tearing or buckling of the strip.

The invention is capable of embodiments other than those shown in the drawings. The carriers can, for instance, be equipped with more than one blade each and means may be provided for varying the angular displacement of the blades in the blade holders. Furthermore, the invention is applicable not only to rotary shears having a uniform movement, but also to such shears in which the carriers are accelerated and decelerated during one revolution for purposes of varying the length of cut.

What we claim is:

1. A rotary flying shear for cutting moving strip material having a pair of blade carriers rotatable in opposite directions and at least one blade rigidly mounted on each carrier, said blades being so positioned on said carrier that the planes through the cutting edges of co-operating blades on both carriers are parallel to the plane passing through the axes of the blade carriers, said carriers and said blades being so arranged relative to each other that the circles described by the cutting edges when rotating on said carriers intersect with each other, said blades being inclined relative to the radial plane through their cutting edges in opposite directions at an angle which is at least equal to half the angle included by the radial planes through the axes of rotation of the carriers for said blades at the points of intersection of the circles.

2. A rotary flying shear for cutting moving strip material having a pair of blade carriers rotatable in opposite directions and at least one blade rigidly mounted on each carrier, said blades being so positioned on said carriers that the planes through the cutting edges of co-operating blades on both carriers are parallel to the plane passing through the axes of the blade carriers, said carriers and said blades being so arranged relative to each other that the circles described by the cutting edges when rotating on said carriers intersect with each other, said blades being inclined relative to the radial plane through their cutting edges in opposite directions at an angle which is at least equal to half the angle subtended by the arcs of the cutting circles of said blades extending between the points of intersection.

3. A rotary flying shear according to claim 1 in which the axis of rotation of one of said carriers is inclined at a small angle to the plane of material to be cut.

ERHARD HENSCHKER.
FRIEDRICH HACHENBURG.

REFERENCES CITED

The following references are of record in the file of this patent:

UNITED STATES PATENTS

| Number | Name | Date |
|---|---|---|
| 2,052,461 | Greenwood | Aug. 25, 1936 |
| 2,246,957 | Shields | June 24, 1941 |
| 2,409,463 | Ahrndt | Oct. 15, 1946 |

FOREIGN PATENTS

| Number | Country | Date |
|---|---|---|
| 484,551 | Germany | Oct. 17, 1929 |
| 792,266 | France | Oct. 14, 1935 |